United States Patent
Heighway et al.

(10) Patent No.: US 7,093,056 B1
(45) Date of Patent: Aug. 15, 2006

(54) METHOD FOR THE COMPILATION OF BUS PACKETS FOR ISOCHRONOUS DATA TRANSMISSION VIA A DATA BUS, AND APPARATUS FOR CARRYING OUT THE METHOD

(75) Inventors: Timothy Heighway, Northampton (GB); Klaus Gaedke, Hannover (DE); Siegfried Schweidler, Gehrden (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/937,468

(22) PCT Filed: Mar. 20, 2000

(86) PCT No.: PCT/EP00/02439

§ 371 (c)(1),
(2), (4) Date: Sep. 25, 2001

(87) PCT Pub. No.: WO00/60478

PCT Pub. Date: Oct. 12, 2000

(30) Foreign Application Priority Data

Apr. 1, 1999 (DE) ................ 199 14 838

(51) Int. Cl.
*G06F 13/36* (2006.01)
*H03M 13/00* (2006.01)

(52) U.S. Cl. ............ 710/310; 710/105; 370/912
(58) Field of Classification Search ........... 710/105; 370/389, 392, 473, 474
See application file for complete search history.

(56) References Cited

U.S. PATENT DOCUMENTS

| | | | | |
|---|---|---|---|---|
| 5,796,743 A | * | 8/1998 | Bunting et al. ........... | 370/474 |
| 5,991,842 A | * | 11/1999 | Takayama ............... | 710/105 |
| 6,091,726 A | * | 7/2000 | Crivellari et al. ......... | 370/392 |
| 6,172,989 B1 | * | 1/2001 | Yanagihara et al. ....... | 370/473 |
| 6,259,694 B1 | * | 7/2001 | Sato et al. ............... | 370/389 |

FOREIGN PATENT DOCUMENTS

| | | |
|---|---|---|
| EP | 0843482 | 5/1998 |
| EP | 0860823 | 8/1998 |
| EP | 0874503 | 10/1998 |

* cited by examiner

OTHER PUBLICATIONS

IEEE Standard Dictionary of Electrical and Electronics Terms, 3rd edition, p. 756—definition of "register" in the art.*

*Primary Examiner*—Christopher E. Lee
(74) *Attorney, Agent, or Firm*—Joseph J. Laks; Robert D. Shedd; Catherine A. Ferguson

(57) ABSTRACT

The format of the transmission of isochronous data packets via the IEEE 1394 bus is defined in the IEC 61883 Standard. A bus packet used to transmit the data has a header at the beginning, which header describes the format of the bus packet. This is then followed by an isochronous data format header, which defines the data format of the useful data in the useful packet. The invention is concerned with the problem of compiling a bus packet for transmission via the 1394 bus. In the case of the invention, this is done in such a way that when the isochronous data transmission is set up, the isochronous data format header prescribed by the application is written both to a special register that is provided and to the buffer memory for the bus packets and the useful data are attached thereto. As a result, it is then possible that a data transmitting section has to take the data to be transmitted, including the isochronous data format header, only from the buffer memory. A multiplex operation joining together the data and the isochronous data format header need not then be effected for the transmission of the data.

8 Claims, 1 Drawing Sheet

METHOD FOR THE COMPILATION OF BUS PACKETS FOR ISOCHRONOUS DATA TRANSMISSION VIA A DATA BUS, AND APPARATUS FOR CARRYING OUT THE METHOD

This application claims the benefit of German application serial no. 19914838.4 filed Apr. 1, 1999, which is hereby incorporated herein by reference, and which claims the benefit under 35 U.S.C. § 365 of International Application PCT/EP00/02439, filed Mar. 20, 2000, which was published in accordance with PCT Article 21(2) on Oct. 12, 2000 in English.

The invention relates to a method of assembling data packets for isochronous data transmission via a data bus. The invention furthermore relates to an apparatus for carrying out the method. The apparatus may be, in particular, part of a bus interface for the connected data bus.

PRIOR ART

The invention is based on a method of assembling data packets for isochronous data transmission via a data bus of the generic type of the independent claim 1. For quite a long time now the convergence of the product sectors of consumer electronics (hifi, video, audio) and personal computing has been trumpeted under the catchword multimedia and has actually been propelled by many manufacturers from both camps. The merging of the two product sectors means that work concerned with the subject of data exchange between the equipment of the different product sectors or else between the equipment within one product sector is becoming more and more significant. This is also apparent from the efforts for standardization with regard to this subject, which are already well advanced. Specifically, the so-called IEEE 1394 serial bus already provides an internationally standardized and very widely accepted bus for data exchange between terminals from both product groups. The precise designation of the aforementioned standard is: IEEE Standard for high performance serial bus, (IEEE) STD 1394-1995, IEEE New York, August 1996.

The invention that is to be described here is concerned with the so-called isochronous data transfer within the abovementioned bus system. In this connection isochronous means that data to be transmitted arise regularly at a data source, the data also arising with approximately the same size each time. Examples of such data sources are video recorders or camcorders, audio devices such as CD players or DAT recorders, and also DVD players or videophone devices, etc. An international standard has been specially developed for this application of isochronous data transmission. The precise designation of this standard is: IEC International Standard 61883 "Consumer Audio/Video Equipment Digital Interface, 1st edition 1998". The first part of this standard describes the general data packet format, the data bus management and the connection management for audio visual data. General transmission rules for control commands are likewise defined.

Very frequently the application relates to the transmission of MPEG2-coded video or audio data. The data are transported via the bus in packets, as already mentioned. In this case, the following structure is provided in the abovementioned Standard IEC 61883: the data generated in the data source are divided into so-called data source packets having a defined size. For MPEG2 video data transmission, for example, the standard stipulates that a data source packet is composed for example of 8 data blocks of identical size. In this case, the data block size can be programmed. It may be between one and 256 quadlets, where a quadlet corresponds to a combination of 4 data bytes. The data source packets are transmitted in one or more bus packets in accordance with the IEC 61883 Standard. A data packet has a so-called isochronous data format header in addition to the elements of bus packet header, useful data field and CRC checksum field. The said isochronous data format header is designated as CIP header (Common isochronous packet) in the abovementioned IEC 61883 Standard. It defines the data format for isochronous data transmission, which is described in detail in the Standard and will be explained in more detail below. This isochronous data format header is called CIP header below. This CIP header is added to the beginning of each data packet after the data packet header. This then ensures that the station which receives the transmitted data packet can evaluate the data in the correct manner.

Although the CIP header largely remains constant throughout the isochronous data transmission, it must nonetheless be newly updated in one section (DBC entry). Added to this, however, is the fact that during isochronous data transmission, the said CIP header has to be present twice in the bus interface, since, on the one hand, a completely assembled data packet can be sent onto the bus, while at the same time new data are provided by the application process, a new CIP header has to be created for these new data.

Owing to this difficulty, we initially considered a solution internally for assembling data packets in which two separate special registers are provided for the CIP headers. The useful data of the respective data packets are provided in a buffer memory. If a packet is to be sent via the bus, then a selection unit must read the correct CIP header from one of the two special registers and transfer it to the data transmitting unit at the correct point in time and then also fetch the associated data from the buffer memory and attach it to the CIP header.

The object of the invention is to simplify the solution described above, to be precise in such a way that the selection logic unit for joining together the CIP header and the associated useful data can as much as possible be omitted.

The invention achieves this object in such a way that, when the isochronous data transmission is set up, it writes the generated CIP header only to one special register and, in addition, also to the buffer memory for the useful data, in which case the useful data of the data packet are subsequently attached to this CIP header in the buffer memory (see claim 1). What is achieved as a result of this is that, for the transmission of the data via the bus, the data transmitting section only has to access the buffer memory for the useful data, where CIP header and useful data are stored contiguously in the correct order. The data transmitting section thus obtains the data to be transmitted only via the buffer memory. A selection logic unit which determines the special register from which the CIP header has to be taken and the memory area of the buffer area from which the useful data have to be attached can be omitted.

Further improvements of the method are possible by virtue of the measures evinced in the dependent claims. According to claim 2, the CIP header may contain a comparison value for data counting. This value must be updated for each bus packet. This is done in such a way that when the data of a data packet are written to the buffer memory, the data are counted and, at the end, the comparison value, determined in this way, for the data count is updated in the CIP header, which is entered in the special register, and the updated CIP header is copied to the buffer memory at the next free location for a data packet. The data of the next data packet would then be attached, in turn, to this CIP header. Consequently, the useful data for the next data packet are again stored contiguously in the buffer memory and they can be transported from there contiguously to the data transmitting section of the bus interface.

In this sense, it is advantageous if the data are counted in units of data blocks and the comparison value for the data count in the CIP header relates to the first data block in the respective bus packet. As a result, the solution then conforms to the abovementioned IEC 61883 Standard, which also stipulates that the comparison value DBC in the CIP header relates in each case to the first data block of a data packet.

The following measures which specify the way in which the corresponding object of the invention is achieved are advantageous for an apparatus for carrying out the method according to the invention (see claim 6). The apparatus comprises a buffer memory for the data of data packets. Furthermore, the apparatus comprises a memory management unit and a special register for a CIP header of a data packet. The apparatus furthermore has initialization means which, when the isochronous data transmission is set up, copy the corresponding CIP header for the first data packet both to the special register and to the buffer memory.

The CIP header for the isochronous data transmission to be set up is preferably prescribed by the application process in the transmitting station.

Also advantageous are the measures according to claim 8, where it is defined that the apparatus furthermore has a data block counter, by which the data blocks of the isochronous data transmission are counted and whose counter reading at the corresponding point in time specifies the comparison value for the data count, which is entered into the special register in which the CIP header for the isochronous data transmission was stored during initialization. Furthermore, provision is made for the respective updated CIP header to be copied to the buffer memory, with the result that the correct CIP header is directly available again in the buffer memory for the next data packet to be transmitted.

BRIEF DESCRIPTION OF THE DRAWINGS

Exemplary embodiments of the invention are illustrated in the drawings and are explained in more detail in the description below. In the figures.

DETAILED DESCRIPTION OF THE PREFERRED EMBODIMENTS

Figure 1:
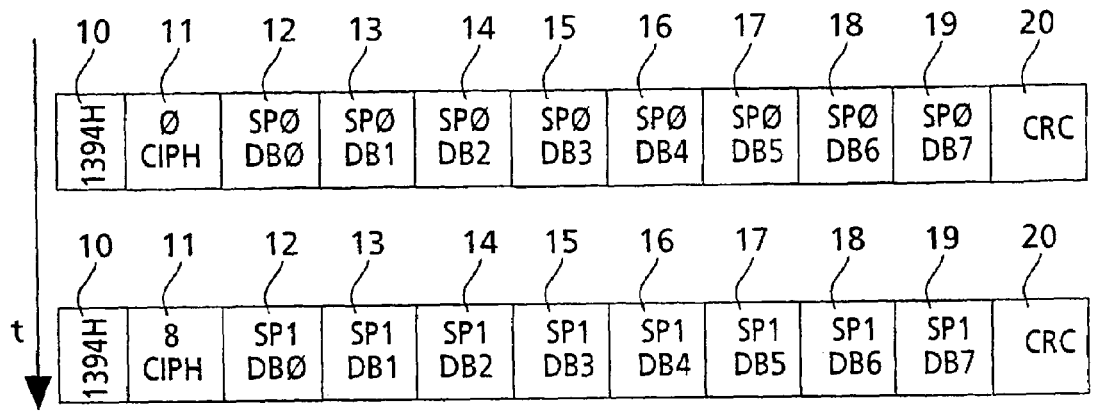
FIG. 1 shows the structure of a plurality of successive data packets for isochronous data transmission.

FIG. 1 shows an exemplary sequence of transmitted data packets. In the example shown, it is assumed that MPEG2-coded video data are to be transmitted during the isochronous data transmission. For this case, the IEC 61883 Standard provides for 8 data blocks with MPEG2 video data to be transmitted per data source packet. The size of the data blocks is specified in units of quadlets in the abovementioned standard. The data block size can be programmed; to be precise, all values between one and 256 quadlets are possible. For the transmission of MPEG2 video data, the IEC 61883 Standard provides for a data block to have a size of 6 quadlets. Furthermore, it is assumed that in each case 8 data blocks are transmitted in a 1394 bus packet. This is possible according to the abovementioned standard and, in this case, all the data blocks of a data source packet can be completely transmitted in one data packet. FIG. 1 shows an exemplary sequence of transmitted bus packets. A first transmitted data packet is illustrated at the top in FIG. 1 and a second transmitted data packet is correspondingly illustrated at the bottom in FIG. 1. The precise structure of a data packet for isochronous data transmission is specified in the abovementioned IEC 61886 Standard. Therefore, for the disclosure of the invention, reference is also expressly made to this standard.

In FIG. 1, the reference numeral 10 designates the header of the data packet. It contains the details regarding the data field of the isochronous data packet, to be precise in a number of bytes, and also further information, but this need not be discussed in any more detail. The header 10 of the data packet is followed by a data field. The latter extends through the area 11–19. At the end of the data packet there also follows an area 20, in which a CRC check word is stored. A so-called CIP header is always provided at the beginning of the data field of a data packet. CIP is the abbreviation of "Common isochronous packet". The CIP header contains a series of information items which describe the isochronous data transfer. Thus, e.g. an identification number SID of the data source is contained therein. Furthermore, it stipulates the size of the subsequent data blocks in the data packet. Likewise, a detail FN (fraction number) is also contained, which specifies the number of data blocks into which a data source packet is divided. As already mentioned, there are always 8 data blocks per data source packet in the case of MPEG2 video data. A further detail QPC (quadlet padding count) relates to how many padding quadlets are attached at the end of the data source packet in order to guarantee that the latter is divided into data blocks of the same size. Furthermore, an information item SPH (source packet header) is provided, which specifies whether a header for the data source packet is likewise also provided in the data packet. Furthermore a DBC value (data block counter) is also provided. This value specifies which data block is the first data block in the data packet referring to all the transmitted data blocks during the isochronous data transmission. Therefore, all the data blocks are consecutively numbered individually. This value practically constitutes a comparison value which can easily be used to check whether a data packet has not been received. To that end, the received data blocks are all counted up in the receiver station. Each time a new bus packet is received, the DBC value contained therein is compared with the counted comparison value. Only if both values correspond have all the data blocks been received and no data packet has been lost. Further information items in the CIP header include an FMT entry (format ID). This entry can be used to signal that the data packet contains no data at all and is a so-called dummy packet. An FDF entry (format depending field) may also be defined, this being mentioned only for the sake of completeness, and also an SYT entry, which comprises a time specification for the data packet.

The data blocks DB0–DB7 for the first data source packet SP0 then follow in the subsequent areas 12–19. The entry 0 in the data area 11 is intended to indicate that the DBC value for this first data packet is set to the value 0, which is synonymous with the fact that the first data block in this bus packet has the number 0. The DBC value is automatically set to this value during the initialization of the isochronous data transfer. This will be explained in more detail below. This must, of course, also be taken into consideration for the comparison count. Therefore, the comparison count likewise begins at 0.

The next data packet again contains 8 data blocks. In this case, they are the 8 data blocks DB0–DB7 of the second data source packet SP1. This may also be followed by further data packets which are likewise constructed in the manner illustrated.

Figure 2:
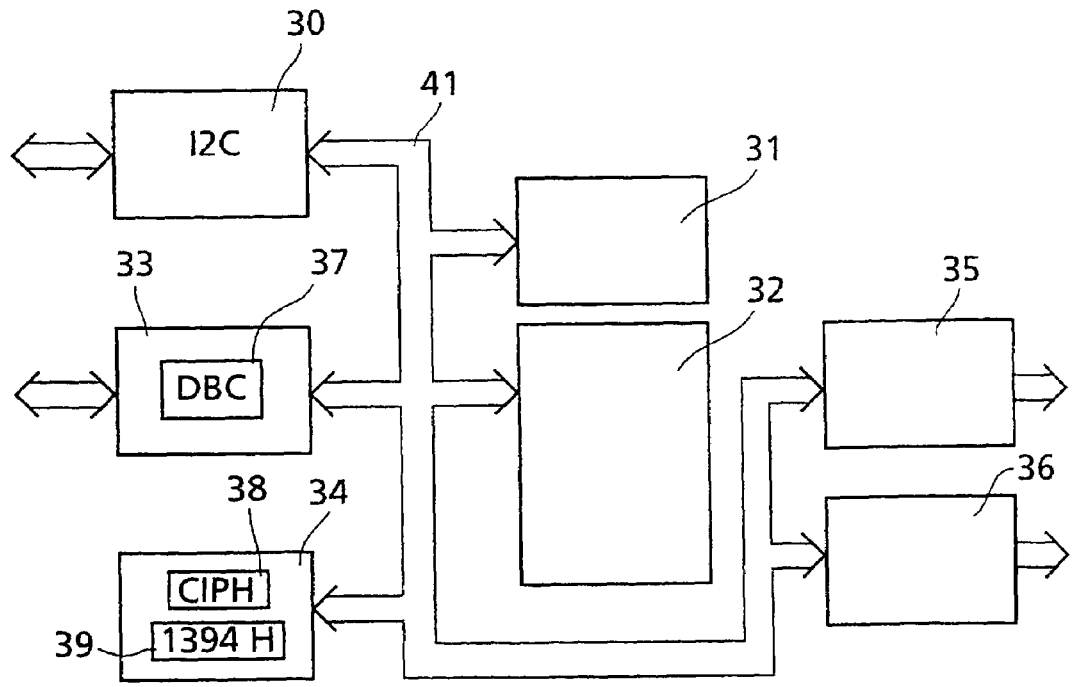
FIG. 2 shows a block diagram of the apparatus according to the invention.

The relevant parts of a bus interface for the invention are illustrated in FIG. 2. These components are parts of a data link layer circuit within the IEEE 1394 bus interface. The reference numeral 30 designates an I2C interface, to which an I2C bus 43 is connected. Via the I2C interface, the IEEE 1394 bus interface can be configured e.g. for isochronous data transmission. The necessary control data are prescribed by an application process via the I2C bus 43. The I2C interface 30 is connected via an internal bus 41 to further components of the bus interface. The reference numeral 32 designates a buffer memory for the data exchange. This buffer memory 32 is managed by the memory management unit 31. In other words, the memory management unit 31 divides the memory in such a way that the incoming and outgoing data are correctly forwarded to the components which each access the memory. The entire address control thus takes place with the aid of this memory management unit 31. It also serves as a bus master for the internal bus 41 and allocates it to the connected units by time division multiplexing.

Furthermore, an AV transceiver unit 33 is connected to the internal bus 41. This unit is in turn connected to a data bus 42, via which all the incoming and outgoing data are relayed to and from the application. The AV transceiver unit 33 also comprises a DB counter 37. This DB counter counts up all of the data blocks received from the application. In accordance with the IEC 61883 Standard, this counter is an 8 bit counter.

As a further component, a register unit 34 is also connected to the internal bus 41. The register unit also contains the already mentioned special register 38 for the CIP header.

Further components which are also connected to the internal bus 41 relate to a data transmitting circuit 35 and a data receiving circuit 36. These circuits are connected to the physical layer IC of the 1394 bus interface. Their function, in the case of the transmission of data via the 1394 bus, is to take the corresponding data packet data from the buffer memory 32 and forward them in the correct order to the physical layer IC. A further task of the data transmitting unit 35 is to perform the CRC check and to attach the corresponding CRC check data at the end of a data packet. In the case of the 1394 bus, a separate CRC check is provided for the data in the 1394 header of the data packet. This is likewise handled by the data transmitting unit 35. The data receiving unit 36 has corresponding tasks, namely CRC checking of a received data packet separately for the 1394 header and for the useful data, and the extraction of the useful data from the data packet and the forwarding of these data to the buffer memory 32.

The method of operation of the apparatus will now be explained in more detail below. If an isochronous data transfer is requested by the application process, the following takes place. The bus interface is initialized via the I2C interface 30, all the units being prepared for the isochronous data transmission. In particular, the CIP header for the isochronous data transmission, which header is prescribed by the application with the corresponding values, is entered on the one hand into the CIP header 38 and on the other hand at the first free location in the buffer memory 32 for a bus packet. It should be mentioned here that the DPC comparison value in the CIP header is set to 0 on account of the initialization. Equally, the counter reading of the DB counter 37 is also reset to 0 as a result of the initialization. Furthermore, the entry for the 1394 header is written to the 1394 header special register 39. This entry depends on the entries in the special register for the CIP header 38. Since the 1394 header does not change throughout the isochronous data transmission, it is not absolutely necessary to transfer this 1394 header simultaneously to the buffer memory 32 as well. Specifically, it is possible to adopt the corresponding 1394 header from the special register 39 each time a bus packet is transmitted. After the 1394 bus interface has been set up for the isochronous data transfer requested, the useful data are supplied by the application via the bus 41. The AV transceiver unit 33 forwards the incoming data in corresponding memory words to the buffer memory 32. The integrated DB counter 37 counts up the data and is incremented each time a complete data block has been forwarded to the memory. The size of the data block is, after all, entered in the special register 38 and the DB counter 37 was set accordingly during the initialization process. After 8 data blocks have then been written to the buffer memory 32, the DB counter 37 outputs a control signal, whereby its current counter reading is transferred to the special register 38, to be precise at the location for the comparison value DBC. At the same time, this signal informs the memory management unit 31 that it should copy the updated CIP header in the special register 38 to the next free location for a data packet in the buffer memory 32. Afterwards, further useful data can then be written to the buffer memory 32 via the AV transceiver 33. At the same time as new data are being written in, however, the data of the preceding data packet can be output onto the 1394 bus via the data transmitting unit 35 and the physical layer IC. The memory management unit 31 allocates the internal bus 41 to the various components by time division multiplexing. In this case, the internal bus 41 is designed in such a way that it can satisfy the bandwidth requirements of the individual components. After all, there is the added fact that via the data receiving unit 36, too, they may enter requirements for forwarding received data into the buffer memory 32, so that the bandwidth requirements of the latter must also be satisfied.

The fact that the CIP header for a data packet to be transmitted resides in each case at the beginning of the assigned memory area for this data packet in the buffer memory 32 ensures that when the data packets are transmitted, first of all access can be made to the special register 39, where the 1394 header of the data packet is stored, and then all of the further data can be taken from the buffer memory 32. This operation is simple to carry out and a relatively complicated switching logic arrangement is not necessary for this purpose.

Various adaptations and modifications of the exemplary embodiments described are possible. The structure with the various internal bus lines and bus lines provided for the external components, as described, may be chosen differently. Parts of the explained apparatus may also be realized by software. The invention is not restricted to use with the IEEE 1394 bus mentioned. It can also be used for other wire-based bus systems or else for a wire-free bus system.

The invention claimed is:

1. A method for assembling data packets for isochronous data transmission via a data bus, a data format for the isochronous data transmission being defined in an isochronous data format header of a bus packet, comprising the steps of:
    writing the isochronous data format header to a special register and to a buffer memory for the data packets when the isochronous data transmission is set up in a data transmitting device;
    attaching useful data of the data packet to the isochronous data format header in the buffer memory; and
    taking both the isochronous data format header and the useful data from said buffer memory for data transmission;
    the isochronous data format header containing a comparison value for data counting, in particular data block counting, further comprising the steps of:
    updating the comparison value for data counting in the isochronous data format header, which is entered in the special register, when the data of said data packet are written to the buffer memory; and copying the updated isochronous data format header to the buffer memory at a next free location for a data packet, after completion of said data packet in the buffer memory.

2. The method according to claim 1, comprising the further step of performing data block counting in units of data blocks, wherein the comparison value for counting data in the isochronous data format header relates to the first data block in the data packet.

3. An apparatus for performing a method for assembling data packets for isochronous data transmission via a data bus, a data format for the isochronous data transmission being defined in an isochronous data format header of a bus packet, comprising the steps of:

writing the isochronous data format header to a special register and to a buffer memory for the data packets when the isochronous data transmission is set up in a data transmitting device;

attaching useful data of the data packet to the isochronous data format header in the buffer memory; and taking both the isochronous data format header and the useful data from said buffer memory for data transmission;

wherein said special register, for the isochronous data format header of one of said data packets, has initialization means which copy the isochronous data format header for a first data packet of the isochronous data transmission to the special register for the isochronous data format header and the buffer memory and transmission means for reading both the isochronous data format and useful data from said buffer memory for data transmission, the apparatus comprising a data block counter, by which the data blocks of the isochronous data transmission are counted, and in which a memory management unit is provided, which transfers a counter reading of the data block counter after the counting of the data blocks of said one of said data packets to the isochronous data format header stored in the special register, and copies the isochronous data format header that has been updated in this way in the special register to the buffer memory at a beginning of the next free location for said one of said data packets.

4. A method for assembling data packets for data transmission via a data bus, the method comprising:

writing a data header to a special register and to a selected portion of a buffer memory for said data packets;

appending useful data in a form of data blocks to said data header located in said buffer memory; and taking both the data header and the useful data from said buffer memory for data transmission wherein said data header further comprises a comparison value for counting data blocks, said method further comprising:

updating said comparison value in said data header in said special register when said useful data in data blocks are written to said buffer memory; and copying said updated data header to said buffer memory at a next free location for a data packet in said buffer memory.

5. The method according to claim 4, wherein said comparison value is a number of data blocks, and further wherein said comparison value relates to the first data block in said data packet.

6. An apparatus for assembling data packets for data transmission via a data bus, comprising:

a buffer memory for the assembly of data packets;

a special register for storing a data header of a first one of said data packets;

an initialization means for copying said data header for said first data packet to said special register and to said buffer memory; and transmission means for reading both the data header and useful data from said buffer memory for data transmission, further comprising a data block counter, by which data blocks of said data packet are counted, and wherein said data block counter transfers a count in said data block counter to said data header stored in said special register, and further wherein said count in said special register is copied to said buffer memory at a next free location.

7. An apparatus for assembling data packets for isochronous data transmission via a data bus, comprising:

a buffer memory for data packets;

a special register for an isochronous data format header of one of said data packets;

initialization means, which copy the isochronous data format header for a first data packet of the isochronous data transmission to the special register for the isochronous data format header and the buffer memory; and a data block counter, by which the data blocks of the isochronous data transmission are counted, and in which a memory management unit is provided, which transfers a counter reading of the data block counter after the counting of the data blocks of said one of said data packets to the isochronous data format header stored in the special register, and copies the isochronous data format header that has been updated in this way in the special register to the buffer memory at the beginning of the next free location for said one of said data packets.

8. An apparatus for assembling data packets for data transmission via a data bus, comprising:

a buffer memory for the assembly of data packets;

a special register for storing a data header of a first one of said data packets;

an initialization means for copying said data header for said first data packet to said special register and to said buffer memory; and a data block counter, by which data blocks of said data packet are counted, and wherein said data block counter transfers a count in said data block counter to said data header stored in said special register, and further wherein said count in said special register is copied to said buffer memory at a next free location.

* * * * *